July 23, 1968  A. W. BLANSHINE  3,393,723

OVERALL DRIVE FOR PROCESSING MACHINE

Filed Aug. 15, 1966  2 Sheets-Sheet 1

INVENTOR
ALLISON W. BLANSHINE

BY

ATTORNEY

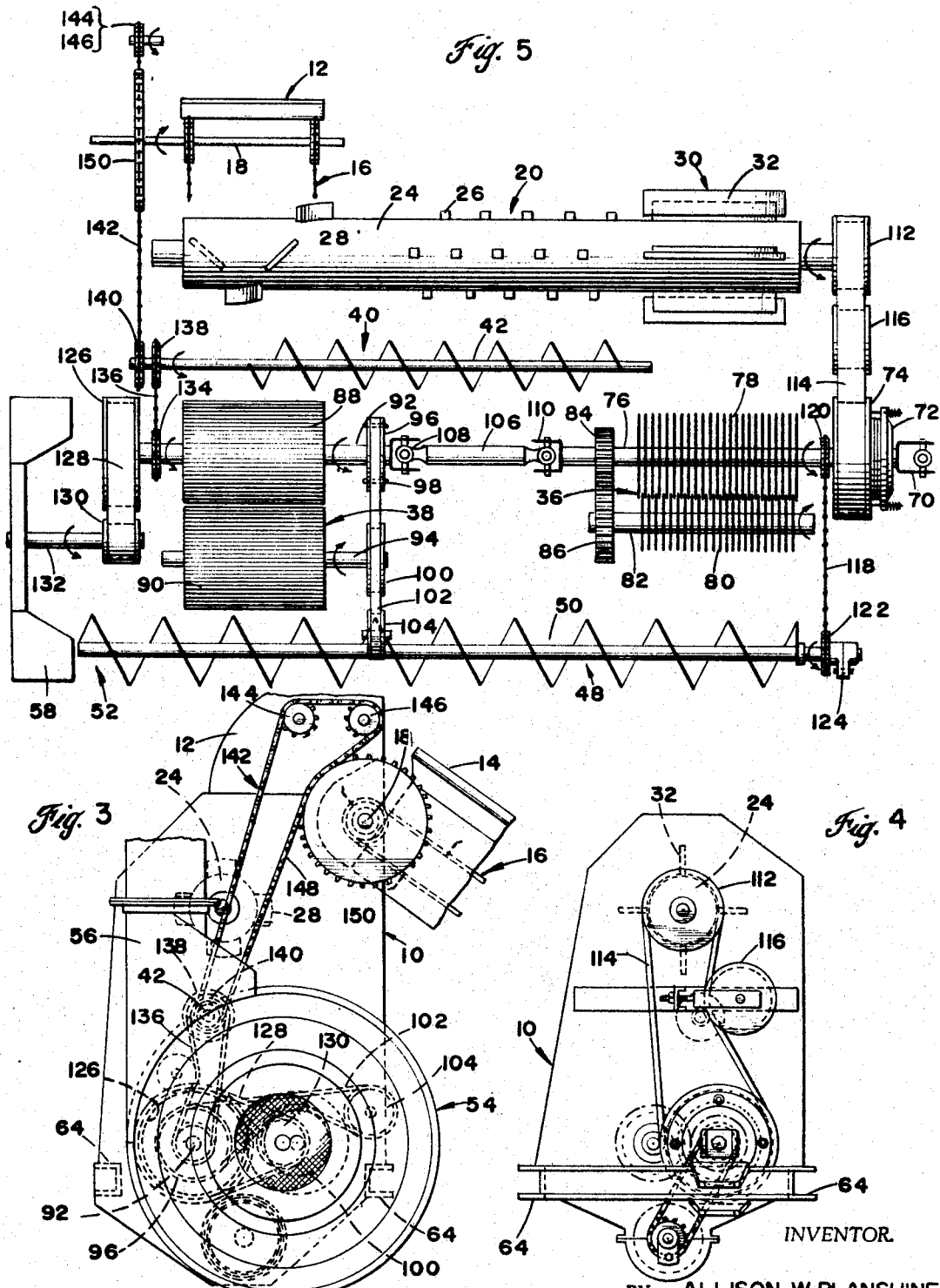

3,393,723
OVERALL DRIVE FOR PROCESSING MACHINE
Allison W. Blanshine, Lititz, Pa., assignor to Sperry Rand Corporation, New Holland, Pa., a corporation of Delaware
Filed Aug. 15, 1966, Ser. No. 572,428
7 Claims. (Cl. 146—71)

This invention pertains to a corn processing machine for receiving and operating upon unshelled ears of corn, substantially as received from a corn harvesting machine for example. More particularly, the present invention pertains to a very simple, powerful overall drive mechanism for the machine embodying an arrangement which produces maximum output efficiency from minimum input power, notwithstanding the inclusion of numerous processing means and units within the overall machine.

The corn processing machine to which the present invention pertains primarily comprises a housing into which ears of corn are introduced, shelling means which remove and separate the kernels from the cobs and discharge the kernels into kernel cracking means, coarse chopping means for the cobs which receive the same directly from the shelling means and produce the first step of disintegration of the cobs, the coarse cob pieces then being discharged directly into cob shredding means which reduce the same to a desired range of relatively fine sizes, conveyor means extending along the lower portion of the housing between the cob shredding and kernel cracking means to convey the products from one means to the other for intermixing of said products which ultimately are discharged through a blower unit at the discharge end of the machine.

The generally overall arrangement and cooperation of the processing means set forth hereinabove generally comprise the subject matter of co-pending application S.N. 546,280, filed Apr. 29, 1966, and owned by the same assignee as the present invention. For purposes of rendering the disclosure reasonably complete in said co-pending application, the apparatus described therein sets forth at least the principal parts of the drive means, including those described in the following specification but the principal purpose of the present application is to describe and also to claim certain overall features of the drive means to afford protection thereto in a different relationship than the manner in which the same is covered by said aforementioned-co-pending application.

Under the foregoing circumstances, it therefore is the principal object of the present invention to provide a relatively simple but mechanically sound design of drive means for a corn processing machine of the type generally set forth above which includes a substantial number of different processing means, said drive means furnishing adequate power to all of said processing means through multiplication of the driving functions from a primary, in-line driving means or system extending from one end to the other of the processing machine directly between certain of the processing means and the opposite ends of said primary driving means having additional, laterally extending connecting drive means at opposite ends of the housing of the machine for transmitting driving force to other processing means in the machine.

Another object of the invention is to arrange the various driving means referred to above in such manner that all parts thereof are readily accessible for repair and adjustment, notwithstanding the fact that the overall machine embodies relatively numerous processing means and units which cooperate with each other in a precise, efficient pattern to produce a desired corn product comprising uniformly mixed portions of cracked kernels and shredded cob material.

A further object of the invention is to arrange all of the moving members of the various processing means of the overall machine for operation along axes which are parallel to each other and also parallel to said longitudinally extending, primary in-line drive means, whereby connecting or take-off drive means at opposite ends of the machine which are interconnected to and extend from the primary, in-line drive means are directly connected to the movable elements of other processing means in the machine without necessitating the employing of twisted or angularly extending connecting drive means, whereby maximum efficiency is achieved in the driving functions of the overall driving system.

Still another object of the invention is to provide certain safety means including a slip clutch and fracturable type connecting means between certain elements of the drive system, whereby excessive loading or any other type of jam-inducing operation will not result in damage to any other of the processing means or the driving mechanism connected thereto.

Details of the invention and the foregoing objects, as well as other objects thereof, are set forth in the following specification and illustrated in the accompanying drawings comprising a part thereof.

In the drawings:

FIG. 3 is a vertical elevation of the left-hand end of the machine as shown in FIG. 1.

FIG. 4 is a vertical end elevation of the right-hand end of the machine as seen in FIG. 1.

FIG. 5 is a diagrammatic layout of the principal moving members of the processing means of the machine shown in FIG. 1 and illustrating in particular the layout of the driving system so as readily to visualize the means interconnecting various portions thereof.

Figures 1, 2:
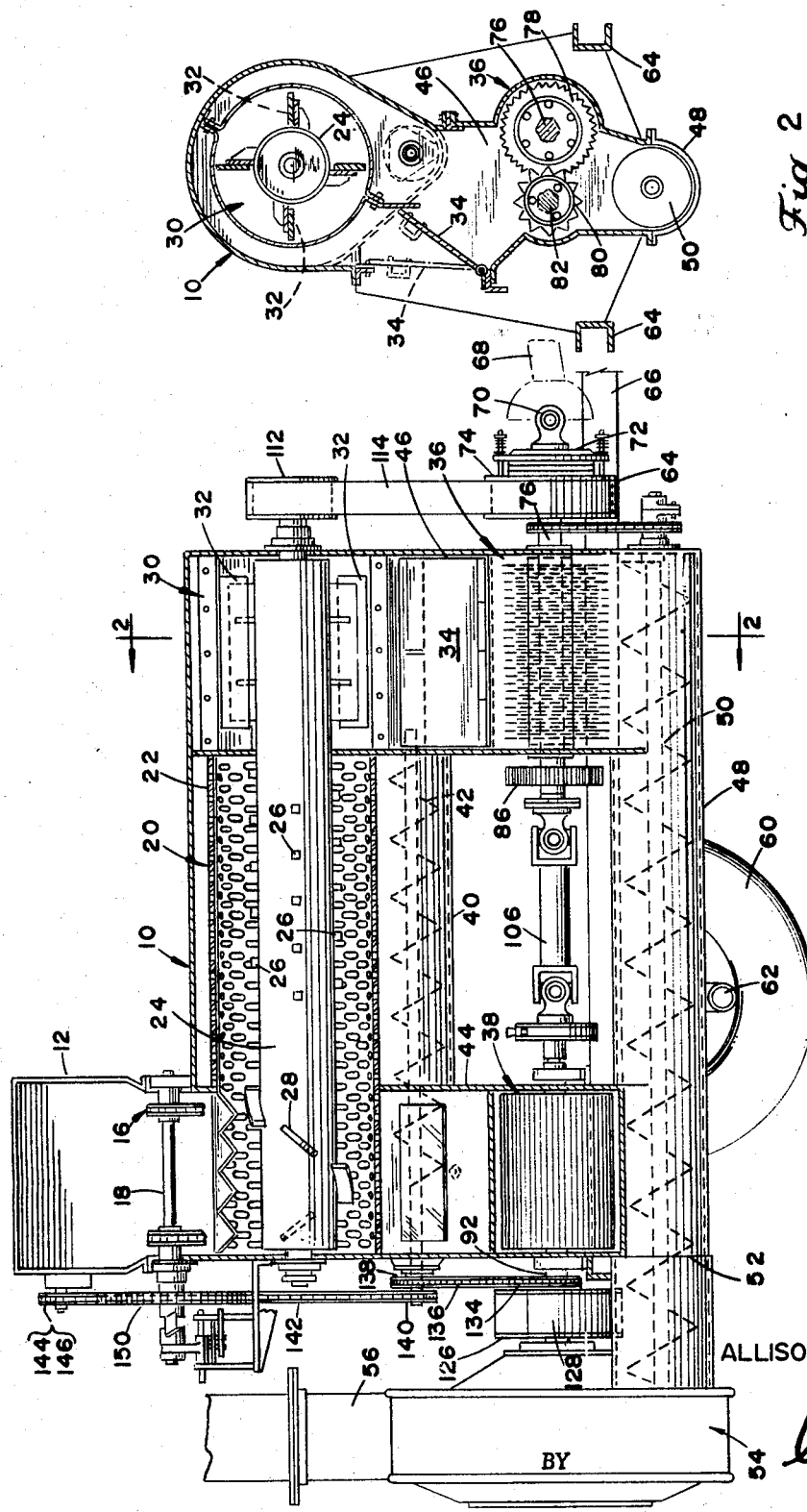
FIG. 1 is a vertical elevation of an exemplary corn processing machine embodying the principles of the present invention, substantial portions of the machine being shown in vertical section extending longitudinally so as better to illustrate certain details thereof.
FIG. 2 is a transverse vertical sectional view of the machine shown in FIG. 1 as seen on the line 2—2 of said figure.

Referring to FIG. 1 in particular, it will be seen that the corn processing machine comprising the present invention includes a housing 10 having an inlet opening 12 adjacent one end of the upper portion of housing 10, the same being arranged to receive ears of corn which are delivered thereto by means of an elevator 14, the upper end of which is illustrated fragmentarily in FIG. 3. The elevator includes a flexible, endless elevator means 16 which, specifically comprises a pair of similar sprocket chains having transverse flights extending therebetween, the chains passing around suitable sprocket gears mounted upon an upper shaft 18 for example.

Shelling means 20 extend longitudinally along the upper end of housing 10 and include a perforated, cylindrical shell 22 through which the shelled kernels pass for separation from the cobs by rotating arbor 24 having appropriate projecting lugs 26 and 28 thereon, the latter being of the type which are skewed in a direction with respect to the axis of arbor 24 to insure axial movement of the newly introduced ears and partially shelled ears toward the right-hand end of the shelling means as viewed in FIGS. 1 and 5.

Also mounted in the upper portion of the housing 10 in axial alignment with the shelling means 20 is a coarse cob chopping means 30. Also as seen from FIGS. 1 and 5, the arbor 24 of the shelling means 20 extends axially into the chopping means 30 for purposes of supporting a plurality of blade-like members 32 which effect such chopping of the cobs into relatively coarse pieces.

Under circumstances where less than the entire amount of cobs introduced into the machine are desired in the final product, an exit door 34 is provided, as seen in the right-hand portion of the mechanism illustrated in FIG. 1 and also being illustrated in FIG. 2 in two different positions of operation. When the door 34 is disposed in the full line position shown in FIG. 2, all of the chopped cob material will be discharged from the machine and when the door is shown in the dotted line position thereof, none of the chopped cob material will be discharged from the machine at this location. Intermediate positions of the door obviously will effect a fractional discharge of the cob material from the machine while permitting the remainder to fall by gravity into the cob shredding means 36 which is directly below the chopping means 30 adjacent the right-hand end of the machine as viewed in FIG. 1.

Also as seen from FIG. 1, the machine is provided with cracking means 38 directly below the inlet 12 of the machine, the left-hand end of the shell 22 discharging shelled kernels of corn directly by gravity into the cracking means for purposes of at least partially cracking each kernel to enhance the digestability thereof by animals intended to consume the same such as cattle, dairy cows and the like. Extending longitudinally along the shell 22, preferably immediately below the same, is an upper conveyor 40 having an auger 42 rotatable therein which insures the movement of all of the shelled kernels discharged from the shelling means 20 into the vertical chute portion 44 of housing 10 which extends between the upper and lower portions of said housing adjacent the left-hand end thereof as viewed in FIG. 1. A similar vertical chute 46 is provided adjacent the right-hand end of housing 10 which extends between the chopping means 30 and shredding means 36 as best shown in FIG. 2.

The lower portion of housing 10 also includes a lower conveyor 48 containing a rotatable auger 50. The opposite end portions of conveyor 48 respectively communicate with the shredding means 36 and cracking means 38. In the particular arrangement specifically illustrated in FIG. 1, the rotation of the auger 50 is such that it moves shredded cob material from the right-hand end of the lower portion of housing 10, as viewed in FIG. 1, toward the left-hand, discharged end thereof, such shredded cob material passing directly below the lower discharge end of vertical chute 44 so as to receive all of the cracked kernel products from said chute and progressively intermix the same with the shredded cob material are formed and moved progressively toward the exit end 52 of lower conveyor 48.

The exit end of lower conveyor 48 discharges into a blower unit 54 supported by the housing 10 and, as best seen from FIG. 3, said blower unit has a tangentially extending discharge conduit 56 for purposes of delivering the intermixed product from the processing machine to any of a number of possible sources such as storage means, feed carts, or the like. The blower unit 54 also includes a fan 58, shown diagrammatically in FIG. 5, which is revolved within the housing of the unit 54. Interengagement between the fan and the material received and discharged by the blower unit effects additional intermixing of the material in order that the product may be substantially homogeneous.

As mentioned hereinabove, the primary objective of the present invention is to provide principles and details of drive mechanism for the overall machine embodying the various means and units described hereinabove, one purpose thereof being to provide a basis for appended claims which cover said drive means in relation to the overall machine. Accordingly, said general principles and details of the overall drive mechanism for the entire machine are set forth as follows:

Under circumstances, for example, where the processing machine is of a portable nature and, for example, is supported upon wheels 60 respectively mounted upon opposite ends of a transverse axle 62 connected to a main frame 64, said frame is provided with a draft end 66, see FIG. 1, which may be connected to appropriate draft means such as a tractor. Under such circumstances, the entire machine readily may be furnished with power from the P.T.O. of such tractor, the same being interconnected to a main drive shaft 68 which is only fragmentarily illustrated in FIG. 1, the same being connected at one end to an appropriate universal joint 70 from which power for the entire processing machine is derived.

As shown in FIGS. 1 and 5, one end of the universal joint 70 is connected directly to a preferably slip-type clutch 72. The pressure exerted between the frictionally interengaging members of said clutch may be varied if desired. The clutch is directly connected to a driving pulley 74 which is mounted on one end of a drive shaft 76 supporting one of a pair of cooperating shredding rollers 78 and 80, the latter being supported on a drive shaft 82, said shredding rollers and shafts comprising the principal moving elements of the shredding means 36. Driving gear 84 is fixed to shaft 76 and meshes with driven gear 86 to effect a positive drive between said shafts and the shredding rollers supported thereon. As seen from FIG. 2, such shredding rollers have serrated edges and comprise a series of similar blades spaced axially apart to permit interdigitation of the toothed peripheries of the blades on the respective rollers to enhance cob shredding thereby.

From FIG. 5, it also will be seen that the cracking means 38 comprises a pair of cooperating longitudinally ribbed cracking rollers 88 and 90 respectively mounted upon a drive shaft 92 and a driven shaft 94, the opposite ends of which respectively are mounted in appropriate bearings supported in opposed walls of the lower portion of vertical chute 44. A drive pulley 96 is fixed to drive shaft 92, preferably by rupturable means which are illustrated diagrammatically in FIG. 5 as exemplary shear pins 98. A driven pulley 100 is fixed to shaft 94 and an endless belt 102, which may be of the V-type if desired, extends around an appropriate idler roller 104 in order that the lower course of the belt 102, as illustrated in FIG. 5, may extend from the lower periphery of drive pulley 96 up over the upper periphery of driven pulley 100 and then around the lower periphery of idler pulley 104 in order to drive rollers 88 and 90 in directions to effect movement of the upper peripheral portions of said cracking rollers toward each other.

In FIG. 5, the shredding rollers 78 and 80 of shredding means 36, as well as the cracking rollers 88 and 90 of the cracking means 38 are illustrated as being in side-by-side relationship but disposed vertically as shown in said figure. However, in actual construction, and especially with reference to FIGS. 1 and 2, both of said pairs of rollers respectively are mounted in side-by-side relationship within a substantially horizontal plane, said plane being common to both the shredding and cracking means as can readily be seen from FIG. 1. The arrangement in FIG. 5 therefore is merely to be considered diagrammatic for purposes of illustrating the driving and driven interrelationship between the respective rollers of each of said shredding and cracking means.

From FIGS. 1 and 5, it also will be seen that an intermediate drive shaft 106 is connected, by means of universal joints 108 and 110 on its opposite ends, respectively to drive shaft 92 of cracking means 38 and drive shaft 76 of shredding means 36. From these figures, and especially from FIG. 5, it also will be seen that by such arrangement, a straight-through, in-line main drive means or system is established between the main drive shaft 68, which introduces power to the entire machine through universal joint 70 to the various interconnected drive shafts 76, 106 and 92 which are interconnected to each other and thereby derive power from the main drive shaft 68.

Such delivery of power, however, is rendered safe through the provision of a slip-type clutch 72 and safety type drive pulley 96 which respectively protect the various processing means against continuing input power in the event of a jam, for example, in the shredding means 36. Under such circumstances, safety type drive pulley 96 renders the machine safe against power from the residual inertia of the momentum of the cracking rollers in cracking means 38, as well as in the additional processing means interconnected thereto as described hereinafter. Such residual inertia momentum functions somewhat in a backlash manner in the event the shredding means 36 jams and such residual inertia would tend to force the shredding means 36 to continue to operate, notwithstanding said jam, were it not for the protective influence of safety type drive pulley 96 for example.

The above-described in-line main drive shaft assembly is utilized to maximum advantage for purposes of driving, in addition to the shedding and cracking means directly associated therewith, all of the other movable processing means and elements of the entire machine of which there are a substantial number as readily can be appreciated from the diagrammatic representation thereof in FIG. 5. Such additional driving of the other means and elements of the machine primarily is achieved through the utilization of what is termed connecting drive means respectively mounted adjacent opposite ends of housing 10, whereby such connecting drive means extends laterally to the axis of the main in-line drive means and also is readily accessible for any servicing which may be required as well can be appreciated both from FIGS. 1 and 5. Details of which additional connecting drive means are set forth as follows.

Considering first the right-hand end of the machine with respect to FIGS. 1 and 5, it will be seen that the common arbor 24 of the shelling means 20 and coarse cracking means 30 has a shaft projecting beyond the right-hand end of housing 10 and supports a driven pulley 112 thereon. Extending around the driving pulley 74 and driven pulley 112 is a driving belt 114 which, in conjunction with said pulleys, comprises one of the connecting drive means adjacent one end of said housing 10 as aforesaid. Preferably an adjusting tensioning idler roller 116 engages belt 114 as clearly shown in FIGS. 4 and 5.

On the same end of the machine as the aforementioned connecting drive means, additional connecting drive means is provided in the form of endless flexible means 118, preferably comprising a sprocket chain, which extends around sprocket gears 120 and 122 respectively fixed to drive shaft 76 of shredding means 36 and the shaft of auger 50, preferably through the means of a rupturable type safety coupling 124 connected between said shaft and sprocket gear 122.

Considering the opposite end of the machine, it will be seen that drive shaft 92 of the cracking means 38 is used equally as extensively or possibly even slightly more so than drive shaft 76 of shredding means 36, it being noted that drive shaft 76 and 92 both comprise part of the main, in-line drive means of the machine.

One of the further connecting drive means arranged at the left-hand end of the machine, considered relative to FIGS. 1 and 5, comprises a relatively large driving pulley 126 fixed to the outer end of drive shaft 92, around which a drive belt 128 extends, the same also extending around a driven pulley 130 fixed to shaft 132 upon which the fan 58 of the blower unit 54 is fixed so as to be driven thereby.

Still another additional connecting drive means which is directly associated with drive shaft 92 is located at the left-hand end of the machine as viewed in FIGS. 1 and 5, the same comprising a drive sprocket gear 134 around which a sprocket chain 136 extends to connect said drive shaft to driven sprocket gear 138 which is fixed to one end of the shaft of auger 42 of the upper conveyor 40. Fixed to the same end of said shaft of auger 42 is an additional driving sprocket gear 140 comprising part of still another connecting drive means at the left-hand end of the machine as viewed in FIGS. 1 and 5. An endless sprocket chain extends around driving sprocket 140 and also around a pair of idler sprockets 144 and 146, shown best in FIG. 3, whereby the course 148 of chain 142 meshes with part of the periphery of large sprocket gear 150 which is connected to the upper shaft 18 which supports the endless flexible elevator means 16 of elevator 14.

From FIG. 1 and especially from FIG. 5, therefore, it will be seen that the entire drive mechanism of the complete corn processing machine is of a somewhat rectangular nature, on even lines, to drive parallel elements and shafts essentially from the substantially straight, in-line main drive shaft assembly comprising shaft 76, 106 and 92, which in turn derive their power from input driving shaft 68, and transmit part of said power by means of various connecting drive means various other processing means and units in the machine.

While the invention has been described and illustrated in its several preferred embodiments, it should be understood that the invention is not to be limited to the precise details herein illustrated and described since the same may be carried out in other ways falling within the scope of the invention as claimed.

Having thus described our invention, what I claim is:

1. A corn processing machine to prepare ears of corn for formation into a comminuted mixture of shredded cobs and cracked corn kernels comprising in combination, a housing having an inlet for ears of corn adjacent one end of the upper part of said housing, horizontally extending corn shelling means in the upper part of said housing extending from said entrance end of said housing toward the opposite end thereof and operable to receive ears of corn and shell and separate the kernels from the cobs, coarse cob-chopping means also in the upper part of said housing in longitudinal alignment with the discharge end of said shelling means and operable to receive the barren cobs from said shelling means and chop the same into coarse pieces, corn cracking means vertically below said inlet in said housing and operable to receive shelled kernels from said shelling means by gravity, cob shredding means vertically below said coarse chopping means and operable to receive coarsely chopped cob material by gravity therefrom and shred the same to a desired range of particle sizes, said shredding means being spaced longitudinally from said cracking means in the lower part of said housing, lwoer conveyor means extending along the lower part of said huosing beneath and between said shredding and cracking means and operable to move processed material from one of said means toward and beneath the other means for intermixing of the processed material from said one means with that from the second means, intermediate drive means extending between said shredding and cracking means, primary drive means connected to one of said last mentioned means to establish an in-line drive means extending longitudinally substantially along the entire lower part of said machine, and connecting drive means extending respectively upwardly along one of the ends of said housing from said longitudinal in-line drive means and connected to said shelling and coarse chopping means to operate the same simultaneously with said shredding and cracking means.

2. The corn processing machine according to claim 1 further including upper conveyor means extending along said corn shelling means and positioned longitudinally along the same to receive shelled corn kernels therefrom and move the same toward said cracking means for discharge thereinto, and said machine also further including an inlet elevator extending outward and downward from said inlet of said housing and including endless flexible elevator means movable therein and arranged to be driven during operation of the processing machine for purposes of feeding ears of corn through said inlet into said housing, said machine further including additional connecting drive means extending upward along the opposite end of said housing from that along which said other connecting drive means extends and connected to said in-line drive means to receive power therefrom and interconnected to said upper conveyor and elevator means simultaneously to operate the same when said other processing means within the housing are being operated by said in-line drive means.

3. The corn processing machine according to claim 1 in which said cracking and shredding means each include pairs of cooperating rollers, one roller of each pair comprising a drive roller of said unit, said drive rollers being axially aligned, and one of said drive rollers being connected to said primary drive means and said intermedaite drive means being axially between said drive rollers of said cracking and shredding means, whereby said drive rollers of said means and said primary and intermediate drive means are all axially and longitudinally in-line with each other along the lower portion of said housing and the opposite ends of said in-line drive means respectively projecting beyond the opposite ends of said housing.

4. The corn processing machine according to claim 3 additionally including blower means connected to one end of said housing adjacent the exit end of said lower conveyor and operable to receive mixed cracked corn and shredded cob material therefrom for purposes of discharging the same from said machine by means of an air current, and said machine including further connecting drive means at one end of said housing interconnected to and extending from one end of said in-line drive means to receive power therefrom and interconnected to the impeller of said blower means to operate the same simultaneously when the other processing means of said machine are operating.

5. The corn processing machine according to claim 3 further including additional connecting drive means extending upwardly along one end of said housing and interconnected at the upper end thereof to said in-line drive means and at the lower end thereof being interconnected to said lower conveyor means to operate the same simultaneously with said other processing means of said machine.

6. The corn processing machine according to claim 1 in which said corn shelling means and coarse chopping means for cobs have a common arbor extending longitudinally therein and therebetween and commonly rotatable therein by said connecting drive means extending upwardly from said in-line drive means.

7. The corn processing machine according to claim 3 further including a safety slip-type clutch mounted between said primary drive means and the other elements of said in-line drive means, connected thereto and driven thereby, and said machine also including additional rupturable type safety connecting means between said intermediate drive means and the processing means driven thereby.

References Cited
UNITED STATES PATENTS

| | | |
|---|---|---|
| 766,699 | 8/1904 | Jorgensen. |
| 3,348,780 | 10/1967 | Barkstrom et al. _____ 241—101 |

W. GRAYDON ABERCROMBIE, *Primary Examiner.*